Oct. 17, 1967   M. F. ELLERBUSCH   3,347,271
BY-PASS VALVE
Filed July 3, 1964   2 Sheets-Sheet 1

INVENTOR.
MAX F. ELLERBUSCH
BY
Pearce and SchaeperKlaus
ATTORNEYS

Oct. 17, 1967  M. F. ELLERBUSCH  3,347,271
BY-PASS VALVE
Filed July 3, 1964  2 Sheets-Sheet 2
FIG. 3
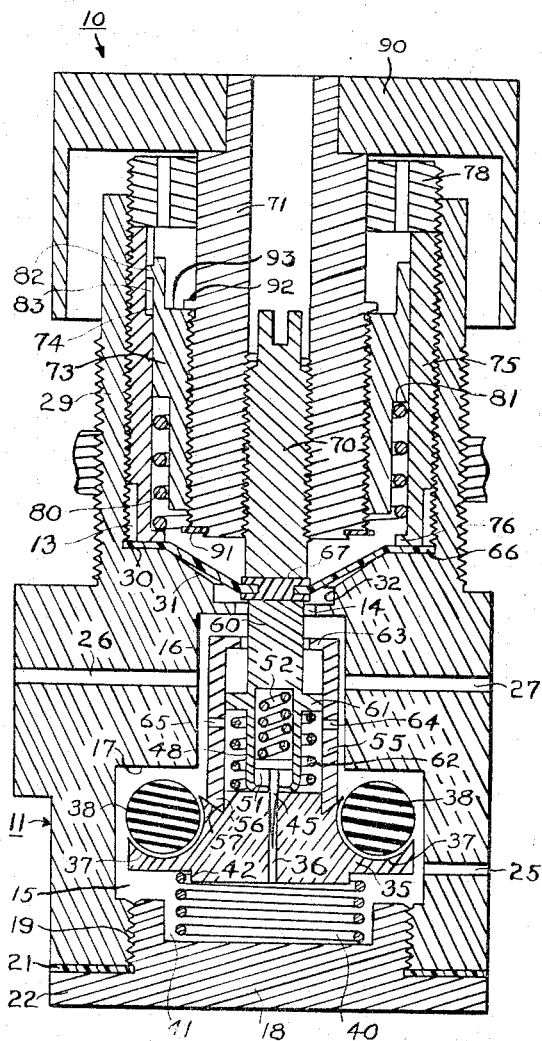
FIG. 4
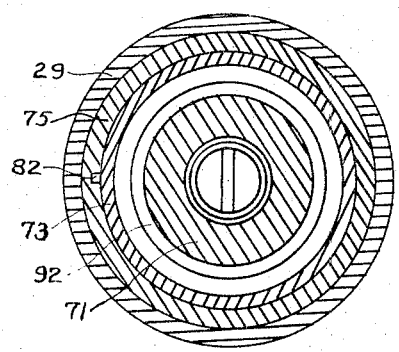
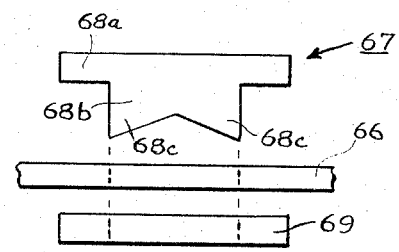
FIG. 6
INVENTOR.
MAX F. ELLERBUSCH
BY
Pearce and Schaeperklaus
Attorneys United States Patent Office 3,347,271
Patented Oct. 17, 1967

3,347,271
BY-PASS VALVE
Max F. Ellerbusch, Mount Healthy, Ohio
(6806 Kenbyrne Court, Cincinnati, Ohio 45239)
Filed July 3, 1964, Ser. No. 380,190
11 Claims. (Cl. 137—637.4)

ABSTRACT OF THE DISCLOSURE

A by-pass valve having upper and lower chambers sealed off from each other by means of a diaphragm; a control seat in the lower chamber having an orifice through which fluid flows, and needle means thereabove, to restrict such flow and thus its rate. A vented sleeve secured to the control seat is provided to accurately align needle and orifice. A valve stem is mounted in the upper chamber, engageable with the diaphragm, actuatable into linear displacement by either rotation thereof or reciprocation thereof, and effecting similar displacement of the needle means in normal use. Reciprocation of the valve stem provides for instant ineffectiveness of the control seat in the lower chamber, thereby providing for flow of fluid directly between an inlet port and an outlet port communicable with the lower chamber, bypassing the orifice and needle restricting same.

Background of the invention

*Field of the invention.*—The field of art to which the invention is most likely to pertain is generally located in the class of valves, and particularly, in by-pass valves. Class 137, Fluid Handling, and Class 251, Valves and Valve Actuation, U.S. Patent Office classification, appears to be the applicable general area of art in which the claimed subject matter of the type involved here has been classified in the past.

*Description of the prior art.*—By-pass valves are generally known. Examples of known by-pass valves are disclosed in U.S. Letters Patent Nos. 01,771; 1,242,245; and 1,506,434.

Summary

This invention relates to valves, and in particular, to a by-pass valve.

An object of this invention is to provide for a valve having novel structure whereby maximum flow of fluid therethrough is capable of being instantaneously realized.

Another object of this invention is to provide for a valve through which passes a controlled rate of fluid that is easily and readily adjustable.

A further object of this invention is to provide means to instantaneously realize maximum flow of fluid regardless of the adjusted controlled rate of flow position of the valve mechanism at the instant maximum flow is required.

Another object of this invention is to provide for elimination of wear and tear on a needle and orifice restricted thereby, said needle floatingly retained in the neck of the orifice in a control seat and through which rate of flow of fluid is controlled.

These and other objects and advantages will be more apparent to those skilled in the art to which this invention pertains, upon a reading of and having the benefit of the following disclosure comprising a written description, appended claims thereto and the accompanying drawing comprising two sheets.

Brief description of the drawing

FIG. 3 is a sectional elevational view of the same valve, again with its mechanism and elements assuming different positions than those viewed in either FIG. 1 or FIG. 2.

FIG. 4 is a view taken on line 4—4 of FIG. 1.

FIG. 6 is an enlarged view of a rivet element preferred in the illustrated embodiment.

Description of the preferred embodiment

Figure 1:
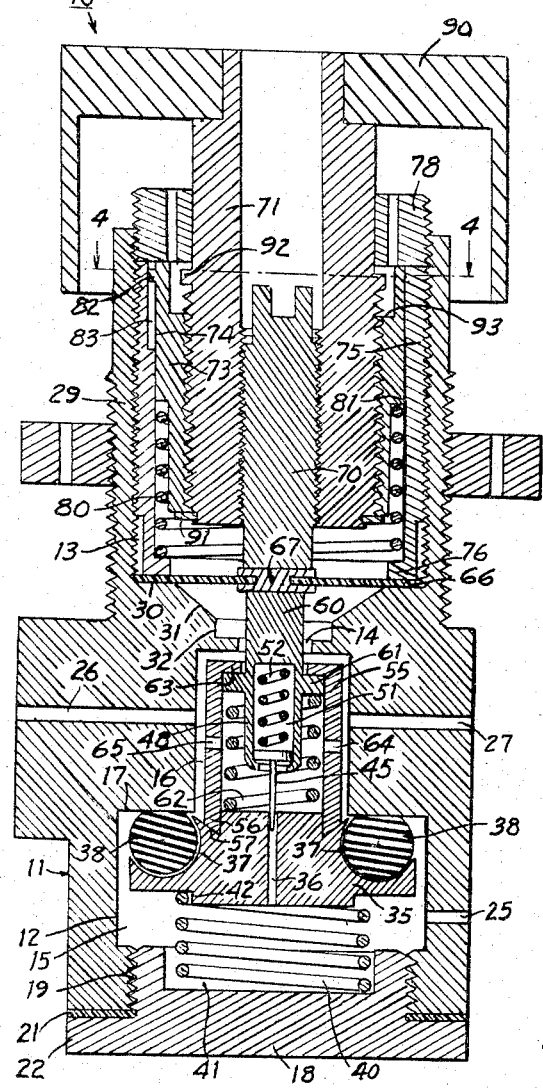
FIG. 1 is a sectional elevational view of a preferred embodiment of my invention encompassing a by-pass valve.
Figure 2:
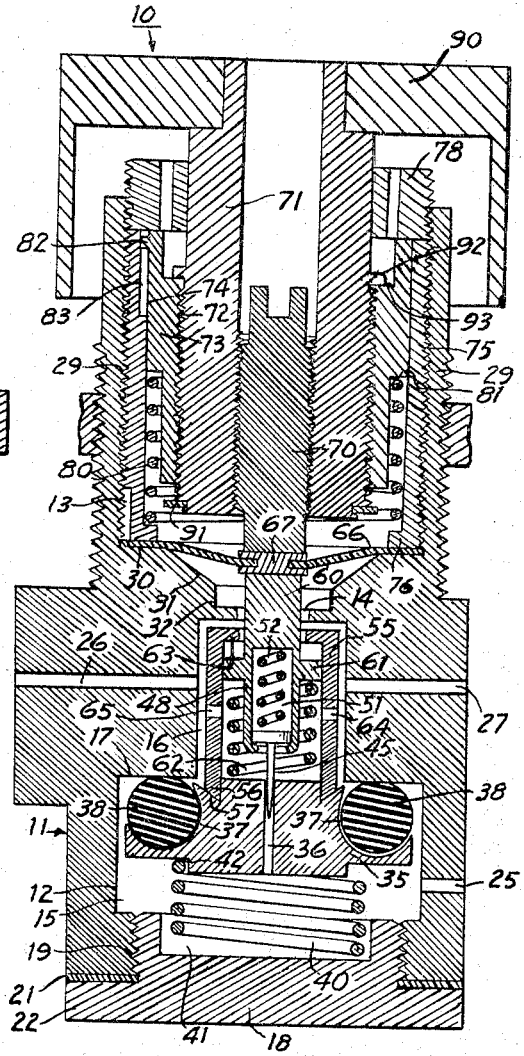
FIG. 2 is a sectional elevational view of such valve the mechanism and elements of which appear in different positions than those viewed in FIG. 1.

Referring now specifically to the drawing illustrating the preferred embodiment of the invention and in which reference characters therein correspond to like characters in the following description, by-pass valve 10 comprises a generally cylindrical housing 11 having a cylindrical lower chamber 12 and a cylindrical upper chamber 13, each communicable with the other through a hole 14 disposed therebetween. Lower chamber 12 is divided into a lower cavity 15, and an upper cavity 16 disposed above lower cavity 15 immediately below and adjacent to hole 14. Both cavities 15, 16 are preferably cylindrical. An annular seat or shoulder 17 is formed as the result of the formation of lower cavity 15 and smaller upper cavity 16 thereof. An externally threaded plug 18 is threaded to an internally threaded aperture 19 at the open end of lower chamber 12 thereby closing same from the atmosphere. A circular gasket 21 of a suitable material is provided for plug 18 and is mounted on a peripheral flange 22 thereof to register on and tightly engage the wall end of chamber 12, as shown in FIGS. 1, 2, and 3.

An inlet port 25 extends transversely through the cylindrical wall comprising cavity 15. One or more outlet ports 26, 27 extend transversely through the cylindrical wall comprising cavity 16 of chamber 12.

Upper chamber 13 comprises an internally threaded cylindrical wall 29, and an annular seat 30 formed at the bottom thereof. Seat 30 is cut away in its centrally disposed area, downwardly, to form an upwardly opening surface 31 conical in configuration. A longitudinal recess 32, preferably cylindrical, is generated downwardly through surface 31 to terminate at hole or aperture 14 that connects lower and upper chambers 12, 13, respectively.

Controlled rate of flow of fluid through valve 10 between its inlet and outlet ports 25, and 26, 27, respectively, is maintained by various relative positions of elements constituting a control mechanism mounted in lower chamber 12. Such a control mechanism comprises a control seat 35 mounted in cavity 15 and in cooperative relationship with shoulder 17. Control seat 35 comprises a cylindrical disc having a centrally disposed orifice 36 communicating between cavities 15 and 16, and is further provided with an annular peripheral groove 37 that faces towards shoulder 17, so that the cross-sectional thickness of an O-ring 38 mounted in groove 37 frictionally engages shoulder 17 when seat 35 is in cooperative relation thereto. O-ring 38 is held in engagement with shoulder 17 by means of a coiled spring 40, or other suitable biasing means, biasing control seat 35 upwardly in cavity 15. Coiled spring 40 sets in a depression 41 formed in plug 18, and extends upwardly to engage seat 35 about a projection 42 cast in the underside of seat 35 all as shown in FIGS. 1, 2, and 3. Thus, flow of fluid between the ports 25, and 26, 27 is routed from cavity 15 through orifice 36 into cavity 16 when control seat 35 is in cooperative relationship or association with shoulder 17 by means of biasing element 40.

Figure 5:
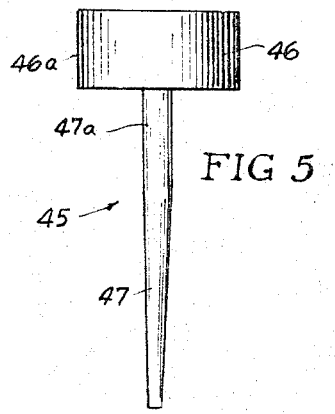
FIG. 5 is an enlarged view of a needle element in the valve.

A needle 45 is provided for restriction of flow of fluid through orifice 36 whereby the relative adjustment of needle to orifice determines and controls the rate of flow of fluid flowing through valve 10. As shown in FIG. 5, needle 45 is preferably an integral member and comprises a circular head 46 and a tapering shaft 47 spaced from head 46 by a uniformly diametered thickness 47a of the shaft. Heat 46 preferably comprises a cylinder having vertical walls 46a uniformly radially spaced from the main axis of needle 45. Thickness 47a is of slightly greater diameter than that of orifice 36, thereby providing for complete closure of the latter by the insertion of tapering shaft 47 of needle 45 sufficiently thereinto. If desired, thickness 47a may be of less diameter than that of orifice 36 to provide for no less than a minimum flow of fluid. Elevational movement of needle 45 from orifice 36 provides for a larger incremental rate of flow of fluid with each increment of upward movement, in view of the tapered nature thereof.

A needle housing 48 is provided for the support of needle 45, and is mounted above control seat 35 in cavity 16. Needle housing 48 comprises a shank or tube having a concentric bore 51 opening downwardly. Head 46 is preferably of slip-fit size in bore 51 so that needle 45 moves in true vertical alignment as the result of needle wall 46a slidably engaging the concentric wall of bore 51. In the instant embodiment, the end of bore 51 is turned radially inwardly to prevent needle 45 from slipping out of its bore 51, although other suitable means may be utilized to effect such a limitation.

A coiled spring 52 is seated in bore 51 to provide for a resilient support for needle 45 as it extends out of bore 51 to project into orifice 36. Such a resilient support effects elimination of excessive frictional engagement between the walls of tapered shaft 47 and orifice 36. Upon maximum insertion of needle 45 in orifice 36, a complete closure of orifice 36 is obtained by a concentric circumferential loci of points on tapered shaft 47 meeting the circular edge of orifice 36, with the lower remainder of tapered shaft 47 floating therein. This floating arrangement is a unique advantage over conventional needle and orifice reciprocating arrangements in which frictional engagement of the two in their interaction brings ultimate damage or shortened life expectancy of either of such elements.

In order to maintain such a unique arrangement of needle and orifice, and the invention and its scope is not limited thereto, rigidly secured to control seat 35 is an aligning means or housing 55 comprising a cylindrical sleeve having an open bottom along which the peripheral circular edge 56 of the wall of such sleeve is inwardly tapered to frictionally engage a concentric circular groove 57 formed in the up-side of control seat 35. An extension 60 formed on needle housing 48 extends upwardly out of the top of sleeve 55 to project through hole 14, to be actuated by a mechanism hereinafter described. A laterally extending annular collar 61 is mounted about and preferably integral with needle housing 48, in slip-fit relation to the cylindrical wall of sleeve 55, thereby providing for a true vertical displacement of needle housing 48 and needle 45 in relation to orifice 36 of control seat 35. A coiled spring 62 is mounted interiorly of sleeve 55 about needle housing 48 and its expansive force between control seat 35 on which it sets and annular collar 61 is utilized to bias needle housing 48 in an upwardly position. Means, such as inturned annular flange 63 mounted at the top of sleeve 55, is provided as a stop for upward movement of collar 61 at the highest position desired for needle housing 48. One or more vents 64, 65 are provided in the wall of sleeve 55 for passage of fluid, escaping from orifice 36 into cavity 16, to outlet ports 26, 27. Such vents are preferably located below the lowest position possible for annular collar 61, which position may be viewed in FIG. 3.

Thus, it will be observed that the rate of flow of fluid escaping from orifice 36 into cavity 16 is conditioned on the extent to which needle 45 extends into the orifice, and the adjustable position or relative linear displacement of such needle into orifice 36 depends upon the translational movement of its housing 48.

Actuating mechanism for the translational movement of needle housing 48 is provided in upper chamber 13. Such mechanism comprises a valve stem 70 mounted in chamber 13 and adapted for vertical displacement. Its axis is preferably coincident with the axis of extension 60 of needle housing 48.

As shown in FIG. 1, valve stem 70 and shank extension 60 are each sufficiently elongated in length to engage the respective sides of a diaphragm 66 mounted in chamber 13 to seal off the fluid-contained chamber 12, when diaphragm 66 is in its unactuated or unflexed position. To limit or eliminate wear on circular diaphragm 66, a round rivet 67 is mounted thereon to engage stem 70 and extension 60 in their vertical displacements. As shown in FIG. 6, rivet 67 comprises a circular head 68a and body 68b insertable through a central aperture of diaphragm 66, and around which body after insertion through the diaphragm a holding ring 69 is clamped, pressed or otherwise secured to body 68b by burring over peripheral edge 68c of body 68b thereon. Valve stem 70 is fixedly secured in an open, threaded bore of a cylindrical body 71 that is adapted to be rotated or reciprocated in chamber 13, each such action (rotation and reciprocation) capable of being independently produced in the operation of valve 10. Cylindrical body 71 is provided with external threads 72 engageable with corresponding threads mounted on the internal cylindrical wall of a circumferentially mounted control sleeve 73. Control sleeve 73 is in turn provided with a smooth outer cylindrical wall 74 freely slidable about and reciprocable against an inner circumferential wall of a diaphragm holding collar 75 whose outer cylindrical wall threadedly engages corresponding threads incorporated in the cylindrical wall 29 forming chamber 13. Diaphragm holding collar 75 is provided with an inturned flange 76 mounted for securing therebelow plastic flexible diaphragm 66, previously described, to seat 30. Diaphragm 66 sets on seat 30 of chamber 13 and is held securely thereon by tightening holding collar 75 and retaining same to such degree by means of a retaining ring 78 threaded to the internal wall of chamber 13 and against the other end of holding collar 75.

The lower outer cylindrical wall of control sleeve 73 is recessed to provide for a spacial void in which is located a coiled spring 80 mounted and compressed between flange 76 and a shoulder 81 formed as a result of such spacial void. Coiled spring 80 biases valve stem 70 upwardly, through the connection of cylindrical body 71 to stem 70 and control sleeve 73. To limit movement of control sleeve 73 to one of mere vertical linear displacement, a radially extending key or lug 82 is provided on its outer wall, as shown in FIG. 4, at or near the sleeve's top, as shown in FIGS. 1, 2, 3, to register in a vertically disposed slot 83 formed in the inner wall of diaphragm holding ring 75.

In operation, finger or hand manipulatable button 90, suitably rigidly secured to cylindrical body 71, is rotated or depressed, to adjust the relative position of needle 45 to orifice 36 thereby controlling and determining the particular rate of flow of fluid through valve 10, or to remove from the valve system the effect of the cooperative relationship of control seat 35 and shoulder 17 thereby obtaining a maximum flow of fluid through the valve, respectively. As shown in FIG. 1, the greatest rate of flow of fluid possible through orifice 36 is provided by the extreme upward positions of needle housing 48 and valve stem 70 carried by body 71. The extension of coiled spring 80 is at its fullest, biasing control sleeve 73 against retaining ring 78. A stop ring 91 is mounted at and about the base of cylindrical body 71, being held thereat in this particular embodiment, by burring over the end face of such body thereagainst, to prevent excessive rotation of such body from out of its control ring 73. Rotation inwardly of cylindrical body 71 displaces valve stem 70 downwardly (FIG. 2), effecting translational vertical displacement of needle housing 48 through flexible diaphragm 66 and extension 60. Control seat 35 remains in cooperative relation with shoulder 17 and minimum rate of flow of fluid or the condition of no flow is realized by maximum insertion of needle 45 in orifice 36, as shown in FIG. 2. In the instant embodiment, such maximum insertion effects a shut-off of flow of fluid, however, it should be understood that flow of fluid may not be completely shut-off at such maximum insertion, depending upon the linear movement of valve stem 70 and needle housing 48, or the relative diameters of orifice and needle, that is provided for in the construction of valve 10.

In FIG. 2, cylindrical body 71 has been rotated inwardly to its fullest, having an integral stop lug or ring 92 engaging an upper shoulder 93 of control ring 73. Control ring 73 remains in its upwardly biased position. The coiled spring 62 about needle housing 48, however, has been compressed as a result of full displacement of valve stem 70 and the consequential translational movement of needle housing 48 accompanying same. Needle 45 has shut-off orifice 36. The resiliency provided for needle 45 by means of spring 52 includes the advantage of minimal frictional engagement of needle to orifice in their floating arrangement heretofore described. In all other positions of the actuation and control mechanisms, except for the condition of maximum flow of fluid, needle 45 literally floats in orifice 36, restricting the flow of fluid therethrough, but not damaging or being damaged.

In the event that maximum flow of fluid is immediately required, regardless of the position of or the number of inward revolutions of cylindrical body 71, valve stem 70, and the other elements affected by the movement thereof, such body and valve stem may be instantaneously depressed or reciprocated to their fullest extent, a condition shown in FIG. 3. In this additional movement, the end of bore 51 of needle housing 48 engages control seat 35 thereby displacing O-ring 38 from contiguous registry with shoulder 17. Control sleeve 73, being threadedly engaged to cylindrical body 71, likewise reciprocably slides, in a vertical manner due to lug 82 keyed to slot 83 in diaphgram holding ring 75. Thus, flow of fluid through inlet port 25 is routed directly to outlet ports 26, 27, i.e., directly through cavities 15 and 16 rather than through the restricted orifice 36 in control seat 35 and thence through vents 64, 65 of housing 55 to cavity 16 and ports 26, 27.

Upon release of button 90, energized compressed spring 80 will reciprocate control sleeve 73 upwardly to engage retaining ring 78, carrying stem 70 and body 71 therewith, and thereby remove from engagement the bore end of needle housing 48 against control seat 35. The subsequent action of coiled spring 40 provides for immediate re-engagement of O-ring 38 with shoulder 17, and the particular controlled rate of flow of the system resulting is that which was in effect immediately prior to depressing button 90. Coiled spring 52 returns needle 45 to its outwardmost projection from bore 51. Needle 45 is shown in FIG. 2 to be so projected, however, it shoud be understood that some compression of spring 52 may result from interaction resulting from the translational movement of needle housing 48 and the contact of portion 47a of shaft 47 with orifice 36, and in the shut-off position, coiled spring 52 may be somewhat compressed under such circumstances.

In the manufacture of each valve 10, cylindrical body 71 may incorporate a preferred number of external threads, or for some particular reason, it may be desired to have it turn a particular number of revolutions from its position shown in FIG. 1 to that shown in FIG. 2. Valve stem 70, on the other hand, in any event, must be capable of sufficient displacement to effect a shut-off of or minimum fluid flow through orifice 36 by means of needle 45. Thus, to secure in proper fixed relation, valve stem 70 to cylindrical body 71, the following method is convenient to determine and obtain such relation: The valve elements are assembled together, and fluid is fed through ports 25 and escapes through ports 26, 27 via cavity 15, orifice 36, vents 64, 65 and cavity 16. Cylindrical body 71 is rotated into its most inward position, which is that shown in FIG. 2, coiled spring 80 being fully extended as shown. Valve stem 70 is slowly threaded downwardly into the bore of body 71. Such threading provides for the translational movement of needle housing 48 necessary for the descent of needle 45 into orifice 36 to a shut-off or minimum point. Such point calculates the proper secured relationship between valve stem 70 and cylindrical body 71. Suitable means, such as solder in the bore of body 71 against stem 70, secures the two elements together at that point. Thereafter, both elements will rotate and reciprocate together.

Pursuant of the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced otherwise than as specifically described and exemplified herein, by those skilled in the art, and having the benefit of this disclosure.

Therefore, what is claimed to be patentably novel is:
1. A by-pass valve comprising in combination,
   a housing having an upper chamber and a lower chamber each communicable with the other,
   a flexible diaphragm sealing said chambers from each other,
   a valve stem mounted in said upper chamber and adapted to rotate and to reciprocate thereby providing for linear displacement thereof,
   means for actuating said valve stem into such displacement, said valve stem engaging said diaphragm,
   means mounted in said lower chamber for controlling rate of flow of fluid thorugh said valve, the actuation by rotation determining the rate of flow of fluid through said valve and the actuation by reciprocation of said valve stem removing the effectiveness of said controlling means to so determine,
   needle housing means mounted in said lower chamber and having an extension at its one end engageable with said diaphragm and its other end movable into engagement with said controlling means,
   a needle in said needle housing means,
   an orifice in said controlling means, said needle floatable in said orifice thereby restricting flow of fluid therethrough,
   inlet and outlet ports each communicating with said lower chamber, and
   means for adjusting the rate of flow of fluid through said orifice,
   said controlling means made ineffective upon reciprocation of said valve stem connected to said extension through said diaphragm and said other end of the needle housing means engaging said controlling means, whereby it is by-passed and maximum flow of fluid is realized between said inlet and outlet ports.
2. The by-pass valve of claim 1 and in which said adjusting means includes said valve stem, extension and needle housing means.
3. In a by-pass valve in which maximum flow of fluid is realized instantaneously over a lesser controlled flow of fluid through said valve, said valve including a needle and orifice arrangement in which said needle by an adjustable insertion in said orifice restricts in varying degrees the flow of fluid therethrough, said valve having upper and lower chambers, the improvement comprising an upper cavity and a larger lower cavity forming said lower chamber, a shoulder formed between said cavities, means for controlling flow of fluid resiliently supported on said shoulder, said controlling means including an orifice connecting said cavities, a needle housing mounted in said upper cavity, needle means resiliently mounted in said needle housing and having its axis coincident with the axis of said orifice, said needle means insertable into said orifice, whereby said needle means floats in said orifice thereby extending the operable life of both needle means and orifice.

4. The valve improvement of claim 3 including means to align said needle housing whereby the axis of said needle means is coincident with the axis of said orifice.

5. The valve improvement of claim 4 wherein said aligning means comprises a sleeve disposed about said needle housing and secured to said controlling means and having at least one vent therein, and a collar mounted on said needle housing slip-fittable to said sleeve.

6. A by-pass valve by which maximum flow of fluid is instantaneously realized over a lesser controlled flow of fluid comprising in combination, a valve housing having upper and lower chambers each communicable with the other, a flexible diaphragm securely seated in said upper chamber sealing said lower chamber therefrom, said lower chamber comprising an upper cavity and a larger lower cavity and having a shoulder therebetween, an inlet port and an outlet port for said valve, each communicating with the lower and upper cavities, respectively, of said lower chamber, a control seat disposed in said lower cavity and cooperatively associated with said shoulder, an orifice in said control seat capable of being restricted for controlling flow of fluid between said ports when said seat is in cooperative relationship with said shoulder, a needle housing in said upper cavity, an upward extension mounted on said needle housing and engageable with said diaphragm, means provided for said needle housing and extension biasing same towards said diaphragm, needle means mounted in said needle housing and adapted to restrict said orifice, a valve stem mounted in said upper chamber engageable with said diaphragm, means to linearly displace said valve stem downwardly deflecting said flexible diaphragm and thereby providing for a direct translational reaction of said needle housing against said control seat, disengaging the latter from its cooperative association with said shoulder and thereby providing for maximum flow of fluid to flow directly between said inlet and outlet ports.

7. The by-pass valve of claim 6 including resilient spring means for maintaining said control seat in cooperative relationship to said shoulder.

8. The by-pass valve of claim 6 including aligning means for said needle means and orifice in said control seat.

9. The by-pass valve of claim 8 and in which said aligning means comprises a sleeve in the upper cavity of said lower chamber and secured to said control seat and having at least one vent therein, and a collar mounted on said needle housing slip-fitted to said sleeve whereby displacement of said needle housing and needle means therein provides for elimination of excessive frictional engagement between said needle means and orifice and for a floating arrangement therebetween.

10. A by-pass valve by which maximum flow of fluid is instantaneously realized over a lesser controlled flow comprising in combination, a housing having an upper chamber and a lower chamber each communicable with the other, a flexible diaphragm securely seated in said upper chamber sealing said lower chamber therefrom, a valve stem mounted in said upper chamber adapted to reciprocate and adapted to rotate, whereby linear displacement of said valve stem occurs upon reciprocation or rotation thereof, means mounted on said valve stem to linearly displace same, said valve stem adapted to register upon said diaphragm upon actuation of said means thereon, said lower chamber comprising an upper cavity and a larger lower cavity and having a shoulder therebetween, aligning means disposed in said upper cavity and having at least one vent therein, a control seat disposed in said lower cavity and having an orifice therein communicating between said upper and lower cavities, said aligning means and base rigidly attached together, said seat in cooperative relation with said shoulder, a needle housing disposed in said aligning means, said needle housing comprising a shank having a bore opening downwardly towards said control seat and an extension projecting upwardly from said aligning means and engaging said diaphragm, needle means mounted in said bore and adapted to extend into and float in said orifice, at least one outlet port in the valve housing formed in said upper cavity, at least one inlet port in the valve housing formed in said lower cavity, whereby linear actuation of said valve stem imparts linear displacement to said control seat through deflection of said flexible diaphragm and movement of said needle housing onto said control base, thereby making direct communication between said inlet and outlet ports of said valve housing in their respective lower and upper cavities.

11. The by-pass valve of claim 10 including means for adjusting said needle means relative to said orifice to control rate of flow of fluid through said orifice from the lower cavity into the upper cavity of said lower chamber, said adjusting means including said valve stem, extension and needle housing.

References Cited

UNITED STATES PATENTS

| | | | |
|---|---|---|---|
| 981,206 | 1/1911 | Lumley | 137—637.4 X |
| 2,612,141 | 9/1952 | Freedman | 137—637.2 X |
| 2,625,909 | 1/1953 | Steely | 137—637.4 X |
| 2,632,471 | 3/1953 | Horton | 137—637.4 |
| 2,743,707 | 5/1956 | Kellersman | 91—457 X |

CLARENCE R. GORDON, *Primary Examiner.*